(12) United States Patent
Siu

(10) Patent No.: US 10,188,966 B2
(45) Date of Patent: Jan. 29, 2019

(54) IMPURITIES OR MATERIALS TRAPPING APPARATUS

(71) Applicant: Hay-ping Siu, Auckland (NZ)

(72) Inventor: Hay-ping Siu, Auckland (NZ)

( * ) Notice: Subject to any disclaimer, the term of this patent is extended or adjusted under 35 U.S.C. 154(b) by 93 days.

(21) Appl. No.: 15/230,804

(22) Filed: Aug. 8, 2016

(65) Prior Publication Data

US 2017/0036142 A1    Feb. 9, 2017

(30) Foreign Application Priority Data

Aug. 7, 2015 (NZ) ........................... 710828

(51) Int. Cl.
    *B01D 21/02* (2006.01)
    *B65D 51/24* (2006.01)
    (Continued)

(52) U.S. Cl.
    CPC ............... *B01D 21/02* (2013.01); *A23L 2/70* (2013.01); *B01D 21/003* (2013.01);
    (Continued)

(58) Field of Classification Search
    CPC ............ B01D 21/003; B01D 21/2444; B01D 21/2483; B65D 11/04; B65D 51/24; A23L 2/70; C12G 1/08; C12H 1/06
    (Continued)

(56) References Cited

U.S. PATENT DOCUMENTS

| 55,341 A | * | 6/1866 | Morse | ...................... | B65D 1/04 |
| | | | | | 215/6 |
| 1,744,947 A | * | 1/1930 | Bowman | .............. | B65D 1/0276 |
| | | | | | 215/6 |

(Continued)

FOREIGN PATENT DOCUMENTS

| CN | 203524521 | | 4/2014 |
| DE | 3600652 | * | 9/1986 |
| DE | 102007060896 | * | 7/2008 |

OTHER PUBLICATIONS

Machine translation of DE 102007060896, Jul. 2008.*
Extended European Search Report—EP 16 18 2766—dated Jan. 31, 2017.

*Primary Examiner* — Christopher Upton
(74) *Attorney, Agent, or Firm* — Young & Thompson

(57) ABSTRACT

The present invention comprises an impurities or materials trapping apparatus for separating or trapping a selected or unwanted materials such as sediment in a pourable material having sediment therein. The apparatus comprises a body having side walls between a first end and second end defining at least a recessed inner space 42, 104, 204, 286 there between for a pourable material. The apparatus includes at least one raised portion 50, 51, 55, 56, 206, 208 having a highest point, angled walls 26 connected to the side walls 7, 40 202, 220, 282 and at least one drainage aperture 16, 110, 210 located within the side walls 7, 40, 202, 220 282 or angled walls 26, 103, 203, 284. The raised portion is located at one end of the inner space and the angled walls 26 are located at a spaced distance from the raised portion. In one orientation of the apparatus, the side walls or angled walls drain at least a portion of the pourable material towards and though the drainage aperture and down to the raised portion and in another orientation of the apparatus, the drainage aperture is blocked thereby retaining any sediment. The apparatus of the present invention can be formed as part of a container or bottle and/or be part of a cap assembly. Methods of operation are also included.

4 Claims, 9 Drawing Sheets

(51) Int. Cl.
    *B01D 21/24* (2006.01)
    *C12G 1/08* (2006.01)
    *A23L 2/70* (2006.01)
    *B01D 21/00* (2006.01)
    *C12H 1/06* (2006.01)
    *C12H 1/02* (2006.01)
    *C12C 13/10* (2006.01)
    *B65D 8/00* (2006.01)

(52) U.S. Cl.
    CPC ..... *B01D 21/2444* (2013.01); *B01D 21/2483* (2013.01); *B65D 11/04* (2013.01); *B65D 51/24* (2013.01); *C12C 13/10* (2013.01); *C12G 1/08* (2013.01); *C12H 1/02* (2013.01); *C12H 1/06* (2013.01); *A23V 2002/00* (2013.01)

(58) Field of Classification Search
    USPC ......... 210/514, 518, 532.1; 215/6, 227, 378, 215/386; 99/277.1; 426/495
    See application file for complete search history.

(56) References Cited

U.S. PATENT DOCUMENTS

| | | | | |
|---|---|---|---|---|
| 1,758,219 A * | 5/1930 | Clarke | .................. | B65D 51/24 210/516 |
| 1,770,480 A * | 7/1930 | Danciger | .................. | B65D 1/06 426/495 |
| 1,793,048 A * | 2/1931 | Brigel | .................... | B65D 51/24 210/532.1 |
| 1,796,478 A | 3/1931 | Rose et al. | | |
| 1,859,362 A * | 5/1932 | Grauman | ................ | B65D 51/24 210/514 |
| 1,865,023 A * | 6/1932 | Leavy | .................... | B65D 51/24 210/514 |
| 2,139,961 A * | 12/1938 | Kleid | ..................... | B65D 51/24 210/514 |
| 2,779,472 A * | 1/1957 | Febbraro | ................. | B65D 1/04 210/514 |
| 4,932,543 A * | 6/1990 | Martus | ................... | B65D 51/24 215/227 |
| 4,978,538 A * | 12/1990 | Gladstone | ................ | C12G 1/08 426/495 |
| 6,260,474 B1 * | 7/2001 | Yahav | .................... | B65D 51/24 215/6 |
| 2013/0056099 A1 | 3/2013 | Alkemade et al. | | |
| 2014/0366655 A1 | 12/2014 | Stevens | | |
| 2017/0050781 A1 * | 2/2017 | Tokunaga | ............ | B01D 21/003 |

* cited by examiner

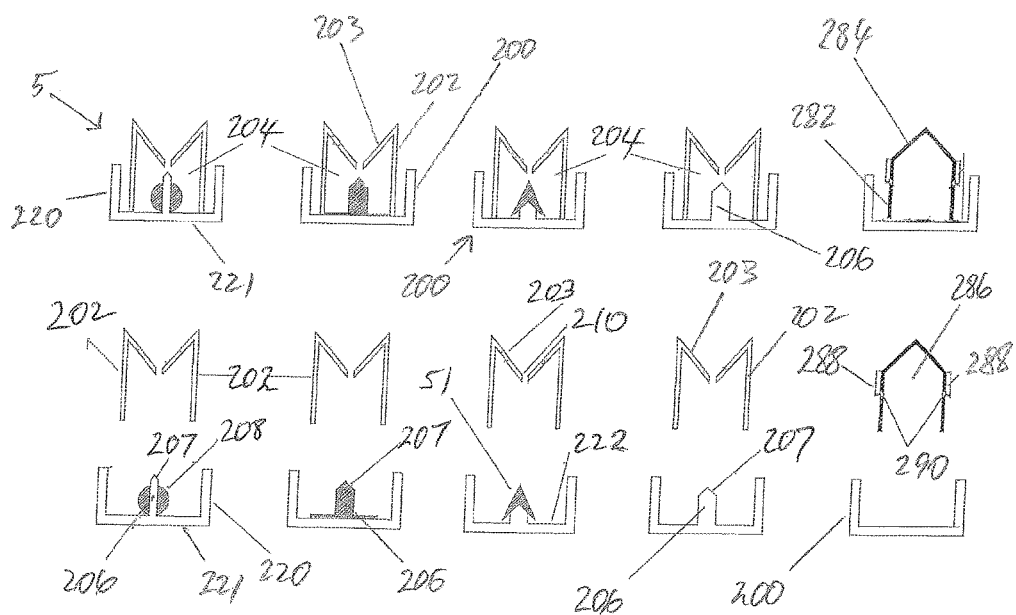

IMPURITIES OR MATERIALS TRAPPING APPARATUS

The invention relates to an impurities or materials trapping apparatus and method of operation for containing, separating or trapping any selected materials, matter, substances, impurities, or solids such as sediment, in a variety of uses. The invention is directed particularly but not solely towards a fermentation container or bottle with a removable sediment trap in a base or in a cap or lid, or be used for or part of any container or part of a container for fruit juice, beverages, or any drinks with inherent residue. Other possible examples of uses include use in the chemical industry or in sewerage treatment processes.

BACKGROUND OF INVENTION

For example separating a material such as a sediment is a common problem with the fermentation process with alcoholic beverages or even with mixing of non-alcoholic beverages or suspension in a container such as for example a bottle. Normally sediment is not allowed for and is not removed but is left to remain in the bottom of the bottle. The presence of sediment in a liquid can be unsightly (eg can cause a liquid to be cloudy) especially for consumers and for marketing promotion.

Furthermore sediment can also get in the way of drinking by being accidently remixed into the rest of the liquid. This sediment can reduce the volume of the beverage able to be stored and sold, so reducing potential profit. Sediment can be unsightly to potential purchasers and hinder the pleasure of drinking. There are also problems in the chemical industry and waste water (eg water or sewerage) industry where it is very important to remove selected impurities or solids from a treatment process which can be complicated and expensive.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

CN203524521 U relates to a thermonatrite collecting type purified boiled water container. The container comprises a container body with an inclined surface and a smooth inner bottom surface, a base hole and a thermonatrite collecting bottle below. A thermonatrite blocking device used for preventing thermonatrite deposited at the bottom of the thermonatrite collecting bottle from overflowing from the inside of the thermonatrite collecting bottle through the base hole and returning to the inside of the container body is arranged inside the thermonatrite collecting bottle. The thermonatrite in the boiled water inside the container body is precipitated on the inner bottom surface through natural precipitation, slides to the base hole along the inner bottom surface and enters the thermonatrite collecting bottle, under the action of the thermonatrite blocking device. The thermonatrite inside the thermonatrite collecting bottle cannot overflow from the thermonatrite collecting bottle or return to the inside of the container body, and therefore purified boiled water inside the container body is obtained.

U.S. Pat. No. 1,796,478 A relates to devices for use in the chemical and brewing industry which have the function of clarifying liquids which have natively or otherwise a cloudiness or matter in suspension which after a time settle in the bottoms of the containers of the liquids. US2013056099 A1 relates to a sediment removal assembly for removal of sediment in a container. The assembly has a container seal for sealing an opening to the container. The container seal is formed with a seal body with a flow through passageway between opposite ends of the seal body, and a valve arrangement with a valve member normally spring biased to close said passageway. One end of said seal body is adapted to sealingly engage said container at an opening thereof to close the opening. The assembly also has a sediment reservoir adapted for removable sealing engagement with the opposite end of the seal body and in communication with the flow through passageway.

US2014366655 A1 relates to a sampler for sampling sediment suspended in fluid, the sampler including a container and a closure. The container includes an opening through which fluid can enter and be contained therein. The closure is associated with the opening of the container and includes a moveable part which on tipping or inversion of the sampler moves between an open and a closed position. In use in the open position the sample can enter the container through the opening and be contained therein, and in the closed position fluid in the container is substantially prevented from leaving the container.

OBJECT OF THE INVENTION

It is an object of the invention to provide an impurities or materials trapping apparatus and methods of operation that ameliorates some of the disadvantages and limitations of the known art or at least provide the public with a useful choice.

SUMMARY OF INVENTION

A first aspect of the invention relates to an impurities or materials trapping apparatus.

Other aspects of the invention are recited in the dependent claims attached hereto.

To those skilled in the art to which the invention relates, many changes in construction and widely differing embodiments and application of the invention will suggest themselves without departing from the scope of the invention as defined in the appended claims. The disclosures and the descriptions herein are purely illustrative and are not intended to be limiting.

BRIEF DESCRIPTION

The invention will now be described, by way of example only, by reference to the accompanying drawings:

FIG. 1 is a cross sectional schematic side view in accordance with a first embodiment being an impurities or materials trapping apparatus for use in a container with an upper part, and lower part, having a sediment forming means located in at least a lower portion of the container or bottle when in an upright position.

FIG. 2 is a perspective schematic view of the upper part of the container.

FIG. 3 is a perspective schematic view of the lower part of the container.

FIG. 4 is a cross sectional schematic view of a second embodiment of the sediment forming means in the lower portion of the container and cap assembly first embodiment—in an upright position.

FIG. 5 is a cross sectional schematic side view of the first embodiment of the cap assembly in an upside down position.

FIG. 6 is a perspective schematic view of the components of the cap assembly of FIG. 5

FIG. 7 is a cross sectional schematic side view of a second embodiment of the cap assembly in an upside down position.

FIG. 8 is a perspective schematic view of the components of the cap assembly of FIG. 7.

FIG. 9 is a schematic cross section of a third embodiment of the cap assembly (plug and cap) showing an assembled cross section at the top, with components below of a plug followed by the component of a cap.

FIG. 10 is a schematic cross section of a fourth embodiment of the cap assembly (plug and cap) showing an assembled cross section at the top, with components below of a plug followed by the component of a cap.

FIG. 11 is a schematic cross section of a fifth embodiment of the cap assembly (plug and cap) showing an assembled cross section at the top, with components below of a plug followed by the component of a cap.

FIG. 12 is a schematic cross section of a fifth embodiment of the cap assembly (plug and cap) showing an assembled cross section at the top, with components below of a plug followed by the component of a cap.

FIG. 13 is a schematic cross section of a seventh embodiment of the cap assembly (plug and cap) showing an assembled cross section at the top, with components below of a plug followed by the component of a cap.

FIG. 14 is a cross section of the fourth cap assembly combined with a first embodiment of a sediment forming means in the lower portion of the upper part and lower part of the container.

FIG. 15 is a cross section of the seventh cap assembly combined with a first embodiment of a sediment forming means in the lower portion of the upper part and lower part of the container.

FIG. 16 is a schematic perspective view of plug of the seventh cap assembly having a cone shaped head and peripheral rib and drain hole to direct sediment to bottom of insider the cone head.

FIG. 17 is a schematic perspective view of the plug of FIG. 16 without the cone shaped head

DESCRIPTION OF DRAWINGS

The following description will describe the invention in relation to preferred embodiments, namely an impurities or materials trapping apparatus 1 and method of operation which is adapted and shaped to form, separate and trap or contain any selected material or unwanted matter or materials or substances in a pourable material such as for example sediment therein which can be found in a pourable material. For example the pourable material can be a liquid powder or granular material.

The impurities or materials trapping apparatus 1 can be used for a variety of uses including for example being at least part of a container or cap assembly or part of any processes for any suitable pourable material where is it required to trap and separate any selected material, substance or ingredient eg a sediment or residue or component. The invention is in no way limited to these preferred embodiments as they are purely to exemplify the invention only and that possible variations and modifications would be readily apparent without departing from the scope of the invention.

Figure 1:
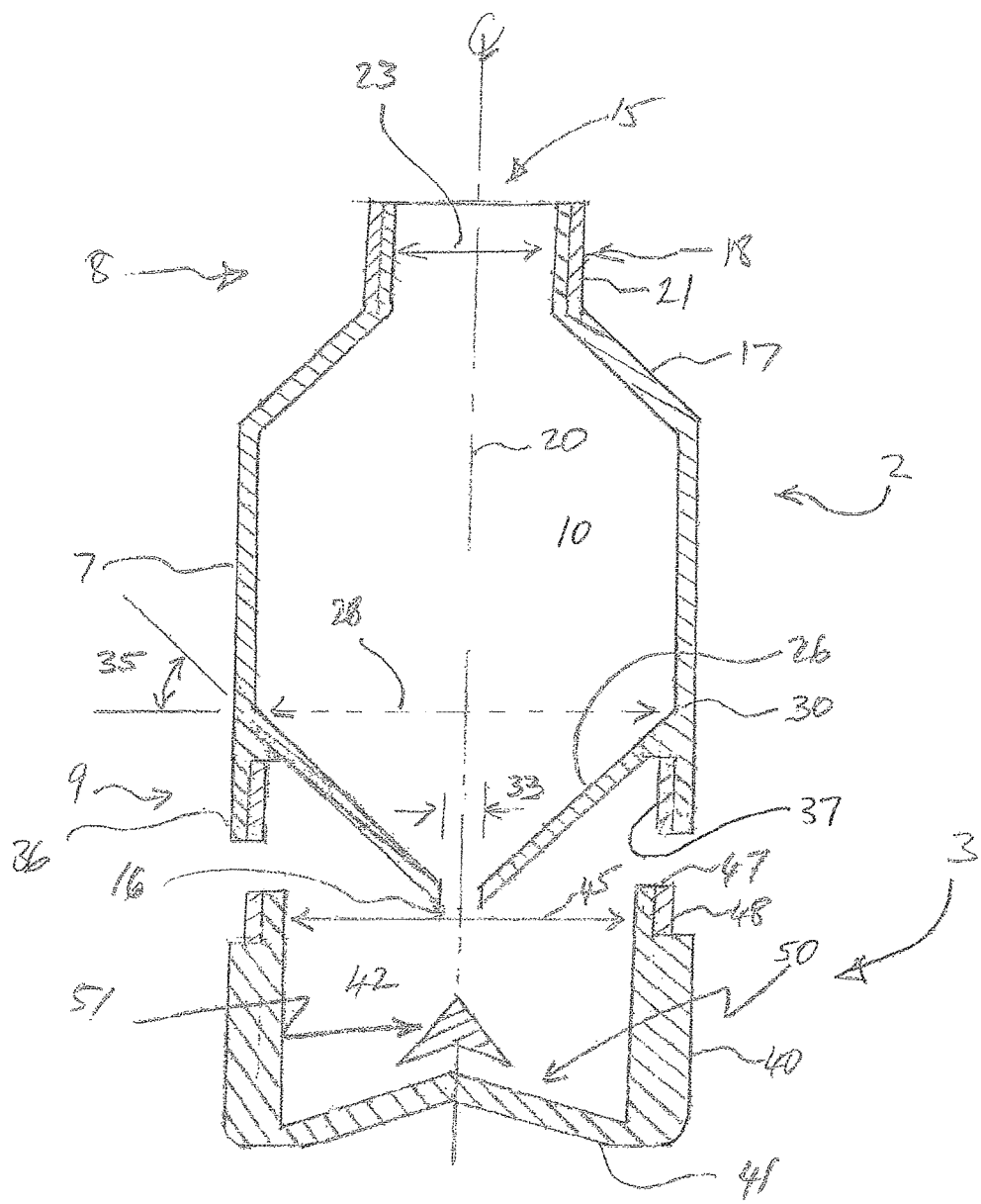
Figure 2:
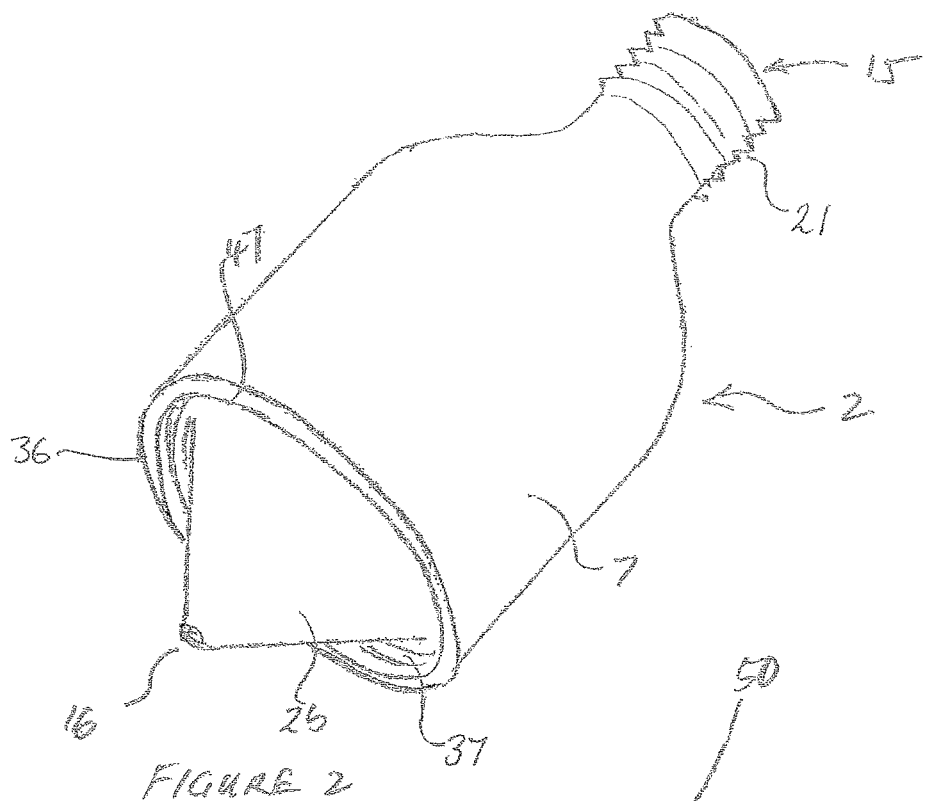
Figure 3:

Though "sediment" is used as one material able to be separated or trapped, the invention is not limited to just trapping that particular form of material as other forms and materials are equally possible assuming that they are part of a material or substance eg liquid, powder or granular materials that can be poured or directed though an opening or aperture in one direction or orientation and be blocked in the other direction or orientation to enable them be separated from a main portion of the material or substance and/or be trapped for removal.

FIGS. 1-17 show the impurities or materials trap apparatus 1 in this example which can be adapted for use in a lower portion of a container or the apparatus can be adapted for use in a cap assembly, for a container which is adapted to cause to separate out and trap sediment or residue from the pourable material when in use in different orientations.

The container can be in the form and shape of a bottle adapted to contain the flowable or pourable material such as for example a liquid. The apparatus 1 includes a body as shown in an upright position or one orientation, with an upper part 2 and lower part 3 including a sediment forming means located within a lower portion of the upper part 2 and in the lower part 3.

Additionally in yet another example, the apparatus 1 can be included in a cap assembly 5 as seen in FIGS. 4 and 6-9 which also can include a sediment forming means in the form of a sediment trap apparatus which are typically tubular or cylindrical in overall shape.

Upper Part 2—See FIGS. 1, 2, 4, 14, 15

Upper part 2 includes a body with side walls 7 between a first end 8 and second end 9 to form a contained inner space 10 to contain a pourable material, there between and therein defining an inner side and an outer side being located outside of the inner space 10. In use the first end 8 is located at an upper end and includes a first opening 15. The second end is located in use at a lower end 9 which has a second opening or drainage aperture 16. First opening 15 downwardly leads to a neck portion 18 which in turn downwardly leads to a shoulder portion 17 which then leads down to the side walls 7 which are substantially vertical and or parallel with each other. Neck portion 18 is shaped and adapted to inter-fit with cap assembly 5 by threading engagement. Side walls 7 in use can be said to be substantially vertical or in a first vertical axis 20. Neck portion 18 can also have neck side walls being vertical or parallel to the orientation of side walls 7, which form the first opening 15 having a first neck diameter 23.

The neck side walls have a threaded engagement means in the form of cap engaging means to allow the cap assembly 5 to removably engage and seal the first opening 15. The cap engaging means can be for example a thread 21 which can be an outer or inner thread which is adapted to intermesh with a corresponding thread of the cap assembly 5.

As part of one form of sediment forming means the lower end 9 of upper part 2, is shaped having a downwardly protruding frusto-conical shaped portion comprising angled side walls 26 beginning at a first cone diameter 28 at a lower end 30 of the side walls 7 and ending downwardly and protruding further beyond the lower end 30 of the side walls 7, in second opening 16 having a second cone diameter 33 whereby the second cone diameter 33 is less in dimension than the first cone diameter 28. Angled side walls 26 are angled at a selected angle 35 with respect to first vertical axis 20. Side walls 7 also extend vertically collinear downwardly beyond lower end 30 in a downward wall extension portion 36 and include lower part engaging means which in this example is an upper part thread 37. Thread 37 can be located on an inner side of the downward wall extension portion 36. Wall extension portion 36 as shown in the drawings is formed as a skirt extending either continuously or separately from a lower end of the side walls 7.

Lower Part 3—See FIGS. 1, 2, 4, 14, 15

As seen in the figures, the other part of the sediment forming means for a lower portion of the container as for upper part 2, includes lower part 3 which includes a body shaped in use as a cup having vertical upwardly facing lower part upright side walls 40 and a base 41 enclosing or forming a recessed space 42 therein and there between, defining an inner surface 41A and outer surface. In this example recessed space 42 can be cylindrically shaped having a lower part diameter 45. Similarly to the upper part 2, recessed space 42 defines an inner side and outside of the recessed space 42, there is an outer side. Lower part side walls 40 have an upper end edge 47 whereby a threaded engagement in the form of a lower part thread 48 can be located near or adjacent the end edge 47 on an outer side to enable thread 48 to removably intermeshed with thread 37 of the upper part 2 and being located underneath angled walls 26.

Base 41 includes sediment forming means in the form of an upwardly oriented protrusion located on or formed within recesses space 42. The upwardly oriented protrusion includes a first raised portion in or on, the inner surface 41A of base 41 shaped as a cone shaped portion 50 with a peak or point.

There is a second raised portion (see FIGS. 1, 14 and 15) which is a movable raised portion that in use when the container is in an upright position is positioned to rest on top of the peak of the first raised portion. In this example of FIG. 1, the second raised portion is shaped as a movable at least one conical stopper member 51 having narrow end upwardly pointing as seen in FIG. 1 which can be formed separately to in use, rest on the inner side of the base 41. Conical stopper member 51 is shaped in cross section as an arrow head shaped to enable it to sit on top of the peak of cone shaped portion 50 as seen in the figures.

Under "variations" there are other variation in the sediment forming means as shown in the figures.

Figure 4:
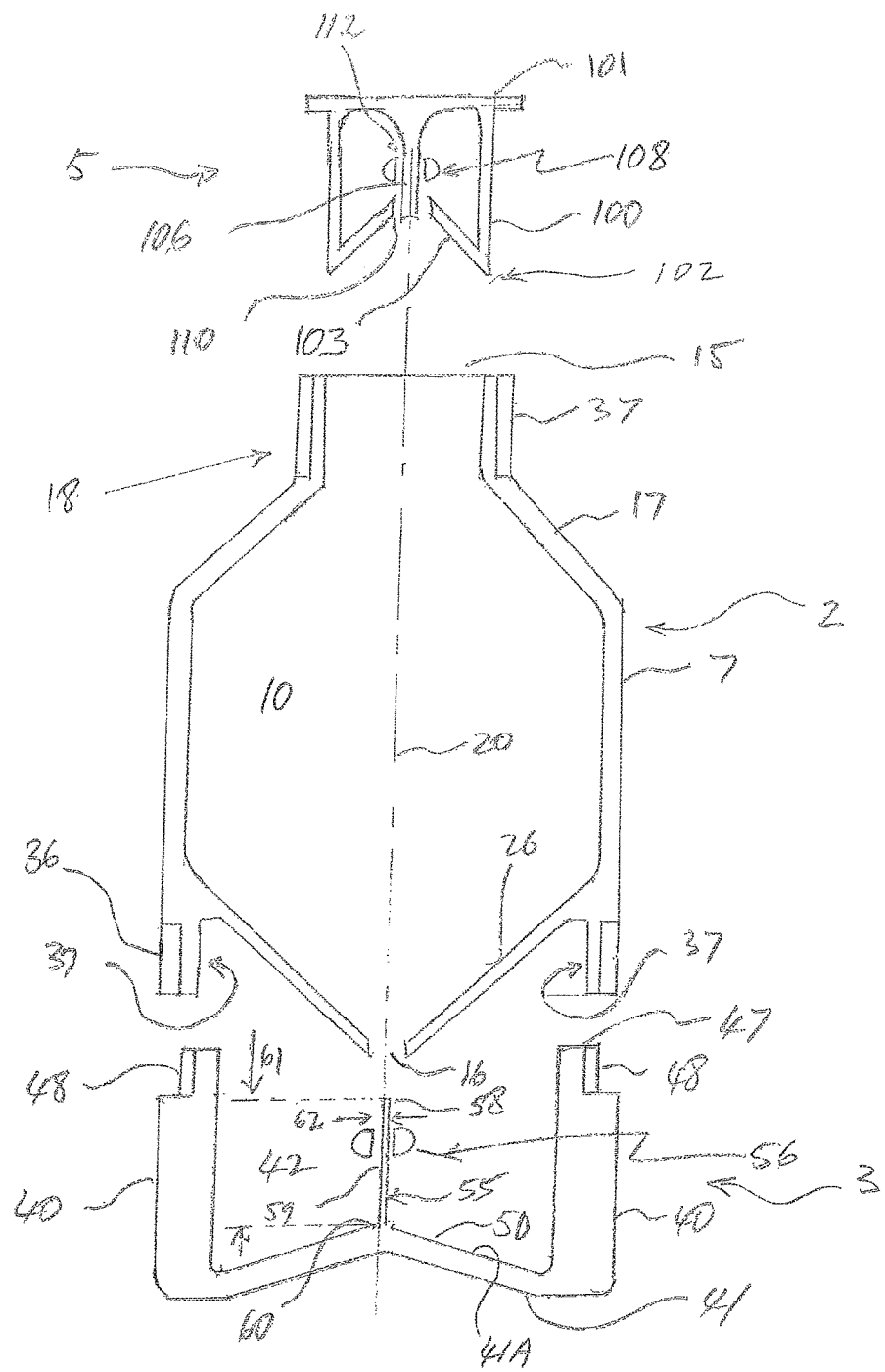
Figure 5:
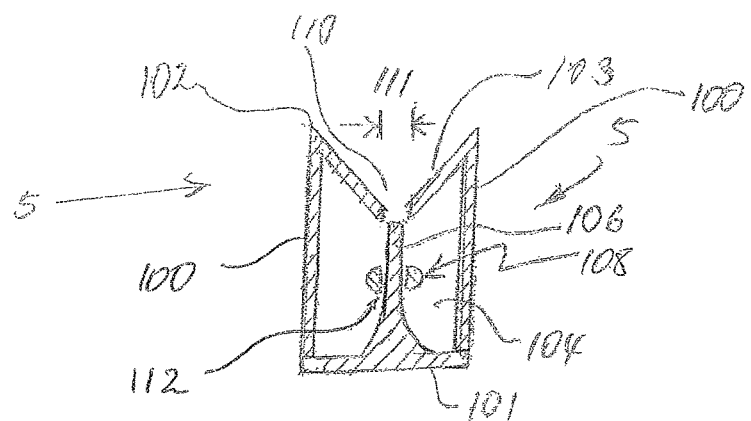
Figure 6:
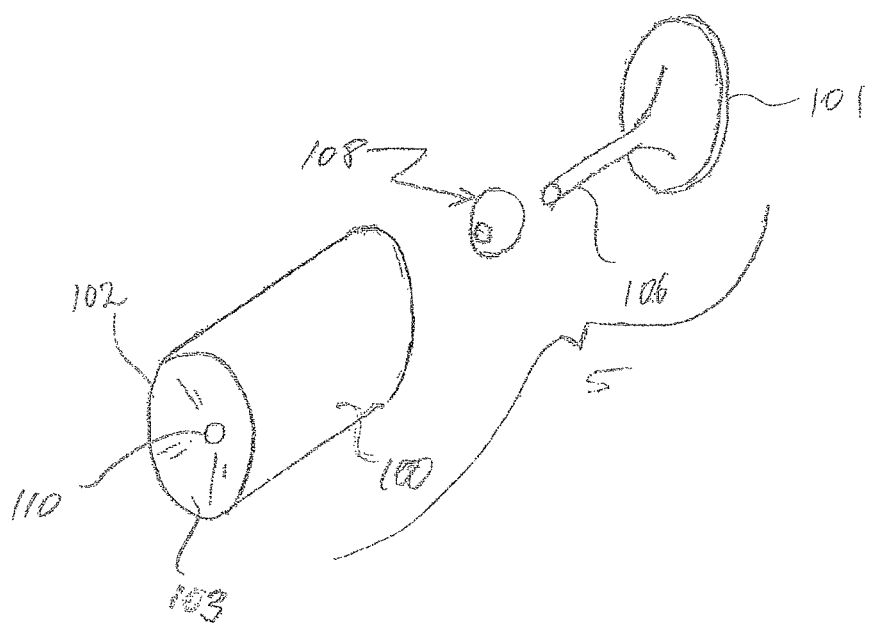

Cap Assembly—First Embodiment—See FIGS. 4, 5, 6

In FIGS. 4, 5, 6, the sediment forming means is shown as also being formed as part of the cap assembly 5 in a first of several embodiments. Each cap assembly 5 of all embodiments includes a cap member, a plug member (includes side walls and angled walls) and raised portions as protruding members or posts and/or beads, stopper members or cone shaped portions which can be formed as one piece or more than one piece.

Cap assembly 5 includes a body with a cylindrical or tubular shape having side walls 100 forming in use at least part of the plug member, between a first end 101 and second end 102 forming a semi or substantially enclosed space 104 therein and between. First end 101 can in use be a top end cap wall forming a closed cap end or cap member 101 and the second end 102 is spaced from the cap end 101 by the side walls 100 forming the semi or substantially enclosed space 104 there between whereby angled walls 103 extend from the end of the side walls 100 (distal to the end cap), to be angled inwardly but not meeting to leave a central aperture 110. Angled walls 103 form a cone like shape. The side walls 100 with the angled walls 103 can be said to form the plug member.

In use the side walls 100 are oriented downwardly within a part of the upper part 2 of the container forming an open end, while side walls 100 of the cap assembly 5 in use are slidably engaged within the neck wall 18 of outlet 15 to be located and abutting an inner side of the neck walls 18. As seen in FIG. 1 cap end member 101 can include overhang portions extending beyond the side walls 100.

The first embodiment of the sediment forming means of the cap assembly 5 is similar to that used in the base of the lower part 3 of the apparatus 1 but is oriented upside down (ie in use hangs down as shown in FIG. 5) and includes at least one cap post member 106 which protrudes downwardly from an inner side of the end cap wall of the first end 101 which includes an end and base. At least one bead 108 is movably slidably located on an outside of post member 106. Therefore the plug member can include cap post member 106 and bead 108.

Figure 7:
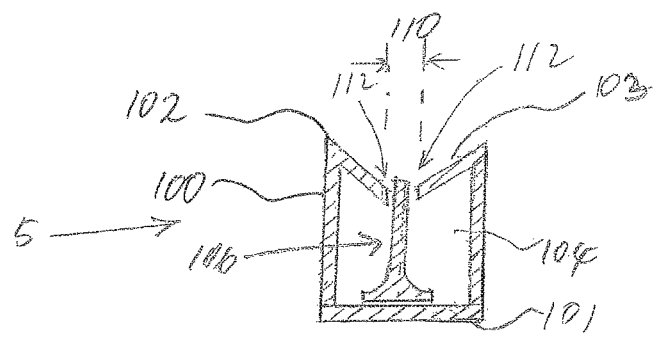

Second end 102 is shaped with angled walls 103 similarly to the angled side walls 26 of the upper part 2 but angled in the opposite direction, to also be angled and curved inwardly within the enclosed space 104 forming the cap end aperture 110. Cap end aperture 110 has a certain cap diameter 111 to be spaced but surround at least a portion of an outside of post member 106 as shown in FIG. 5 to form a peripheral gap 112 there around. Post member 106 extends within the semi enclosed space 104 to be located and positioned at least towards or close to the cap end aperture 110 like in FIGS. 5 and 6, or be passing through the end aperture 110 as seen in FIGS. 4 and 7.

As seen in FIGS. 5 and 6 for the first embodiment of the cap assembly, the cap body can be formed as separate components (ie—as in FIGS. 5 and 6 for 101, 100+103, 106) or be formed in one piece as in FIG. 4 but with separate bead 108. The raised portions includes cone shaped portions 50, conical stopper member 106, 51 post member 55 and bead 108.

Method of Operation

In use for example assuming the container is an upright orientation, liquid is poured through first opening 15 at the top of the container to firstly fill up to a suitable level above the angled side walls 26 whereby with gravity, in time any impurities or sediment and liquid, also drop and are directed down the side walls 26 and through second opening 16 (which is open) to then firstly hit the conical stopper member 51 or bead 108 to then hit the cone shaped portion 50 of base 41.

When the container is turned upside down or rotated to change its orientation, the conical stopper 51 will then move down to block the second opening 16 of the upper part 2 so that any liquid and sediment will not re-enter space 10 of the upper part 2 and the cap end aperture 110 of the cap assembly 5.

The bead 108 of the cap assembly 5 will sit on the cap aperture 110, 210 to block it when the container or cap assembly is oriented in an upright orientation but when turned upside down the bead 108 will slip towards the inner side of the first end 101 of end and base of cap member to allow the end cap aperture 110 to be open to receive any sediment and or liquid.

The second opening or drainage aperture 16 and the other drainage openings 110, 210 are all shaped and oriented to allow any pourable material to be funnelled towards and through the aperture or opening, to then be peripherally collected in the base 41 of the container or in a base of a cap member of a cap assembly (within the recessed space 42, 104, 204) and then oriented to not be able to return back through the aperture or opening 16, 110, 210 with or without a movable bead 108, 208 on a post member 55, 106, 206, cone shaped member 50 or stopper member 51.

In summary the invention comprises one method of operation of the impurities or materials trapping apparatus in a container which includes the following steps of:

In one orientation the container is oriented in an upright direction whereby a portion of the pourable material with impurities is able to travel down through the drainage aperture 16 which is in an open configuration with the bead located distal to the drainage aperture 16 and into recessed space 42;

the container is then oriented in an opposite direction or upside down, to thereby cause the bead 56 to travel down to close the drainage aperture 16 and retaining or trapping any impurities in recessed space 42.

While in the upside down orientation, the container is then adjusted to remove the lower part 3 from the upper part 2 (which retains the pourable material) to allow removal of any unwanted impurities.

In summary the invention can also comprise a method of operation of the impurities or materials trapping apparatus in a cap assembly in a container which includes the following steps of:

In one orientation the cap assembly is oriented in an upright direction whereby the pourable material with impurities is not able to travel upwardly through the drainage aperture 110, 210 which is in a closed configuration with the bead 108, 208 located on top of the drainage aperture 110, 210 but within the recessed space 104, 204;

the cap assembly is then oriented in an opposite direction or upside down, to thereby cause the bead 56 to travel away from the drainage aperture 110, 210 to then be open and allow a portion of pourable material with impurities to be trapped in the recessed space 104, 204.

Then the cap assembly is rotated back to the first upright orientation whereby, the cap assembly with drainage aperture 110, 210 closed, is then able to be removed (unscrewed or unplugged) from the container (eg upper part 2) to allow for the removal of any unwanted impurities.

Advantages a) simple method of separating sediment from a liquid
b) easy to access and remove sediment
c) Simple to manufacture
d) modest cost
e) Simple operation
f) Less likely to get cloudy liquid
g) Less likely to get sediment in portion being drunk
h) Better shelf quality of liquid
i) Cap assembly and lower part of container can each have some form of sediment containment or trapping means
j) Can be useful for fermentation process or manufacturing
k) May eliminate second fermentation for brewing
l) Effective filtering mechanism
m) Maintain inherent characteristic and flavour in comparison to mechanical filtering
n) Cap assembly will also assist in many of the above advantages
o) Able to be used in chemical processes
p) Able to be used for any beverage
q) Able to be used in processing sewerage or waste water Variations For purposes of the description hereinafter, the terms "upper", "lower", "right", "left", "vertical", "horizontal", "top", "bottom", "lateral", "longitudinal", "side", "front", "rear" and derivatives thereof shall relate to the invention as it is oriented in the drawing figures. However it is to be understood that the invention may assume various alternative variations, except where expressly specified to the contrary. It is also to be understood that the specific devices illustrated in the attached drawings, and described in the following specification are simply exemplary embodiments. Hence specific dimensions and other physical characteristics related to the embodiments disclosed herein are not to be considered as limiting.

In practical terms, either bottom part 3 or the cap assembly 5 may only be employed by themselves. However, using all components or parts may still be useful in some situations. The cap assembly 5 is normally removed for drinking purposes. For example the cap assembly 5 might be useful for champagne manufactures in particular such as for example so called methode traditionelle. Bottom part 3 is aimed at brewing or home brewing though the use of any components or parts of the present invention is not limited to this type of use.

The container can have any shape, thickness dimension and material type and can be used for any liquid where it is desired to or has the possibility of forming a sediment or an impurity that needs to be trapped and possibly removed. Any of the parts or components of the apparatus can be formed separately and jointed or connected or can be formed integrally.

The method of attaching the upper part 2 to the lower part 3 and the cap assembly 5 to the neck portion 18 or any of the individual components, can be varied such it can be a clipping action or friction fit or the threads can be oriented on opposite sides to that shown or they can be glued or screwed. The angle, length and position of the angled side walls 26 and 112 can be varied to suit the quantity of liquid being stored or the size of the container etc. One example of an angle can be between 20-30 degrees from the horizontal. The neck portion 18, shoulder portion 17 and first opening 15 can also be varied to be as small or large or as wide as required.

Cone shaped member 50 is shown as being formed as part of the base 41 though equally this member be formed separately and attached by for example, gluing or screwing. Other shapes for the cone shaped member are also possible. The number and shape of the apertures or openings can be varied and angle of the walls 26, walls 103.

Figure 14:
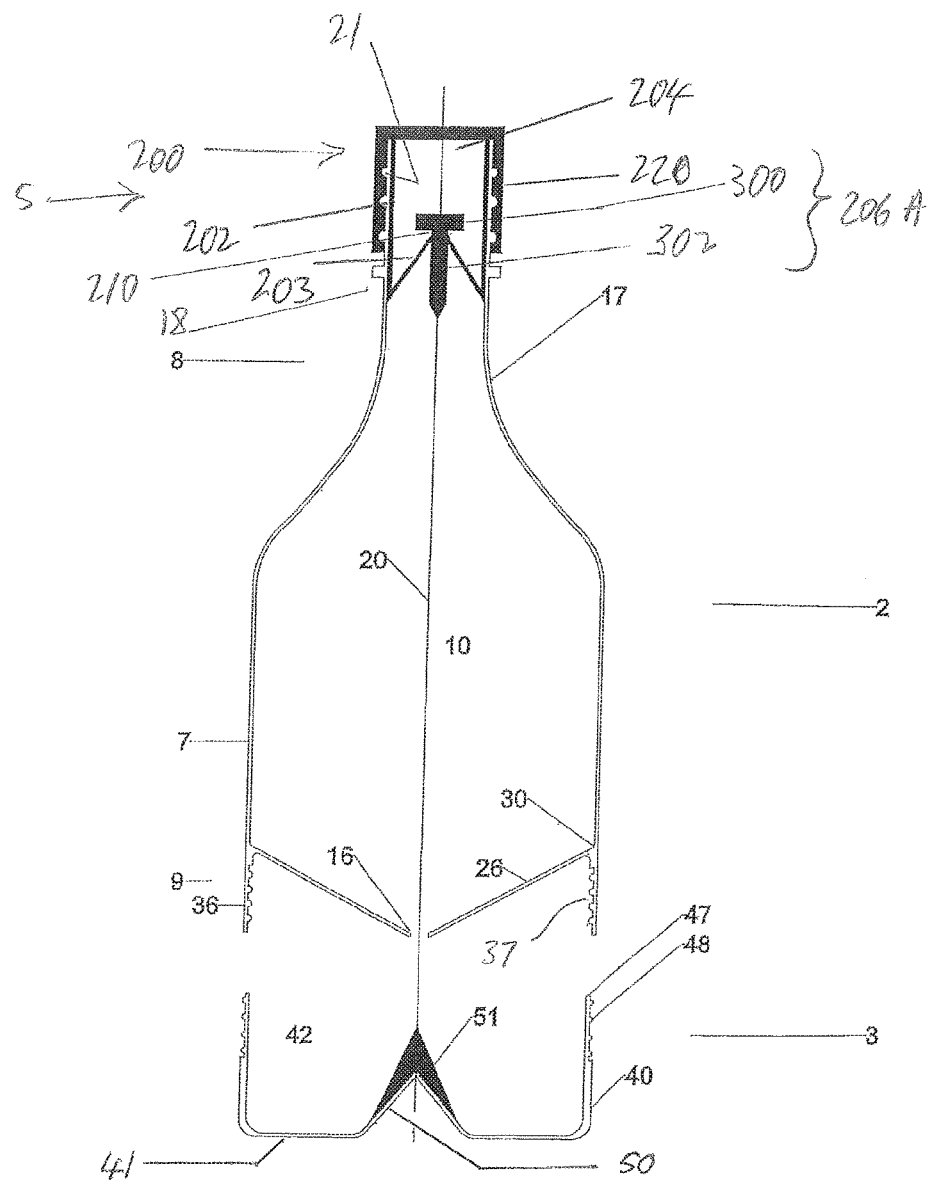
Figure 15:
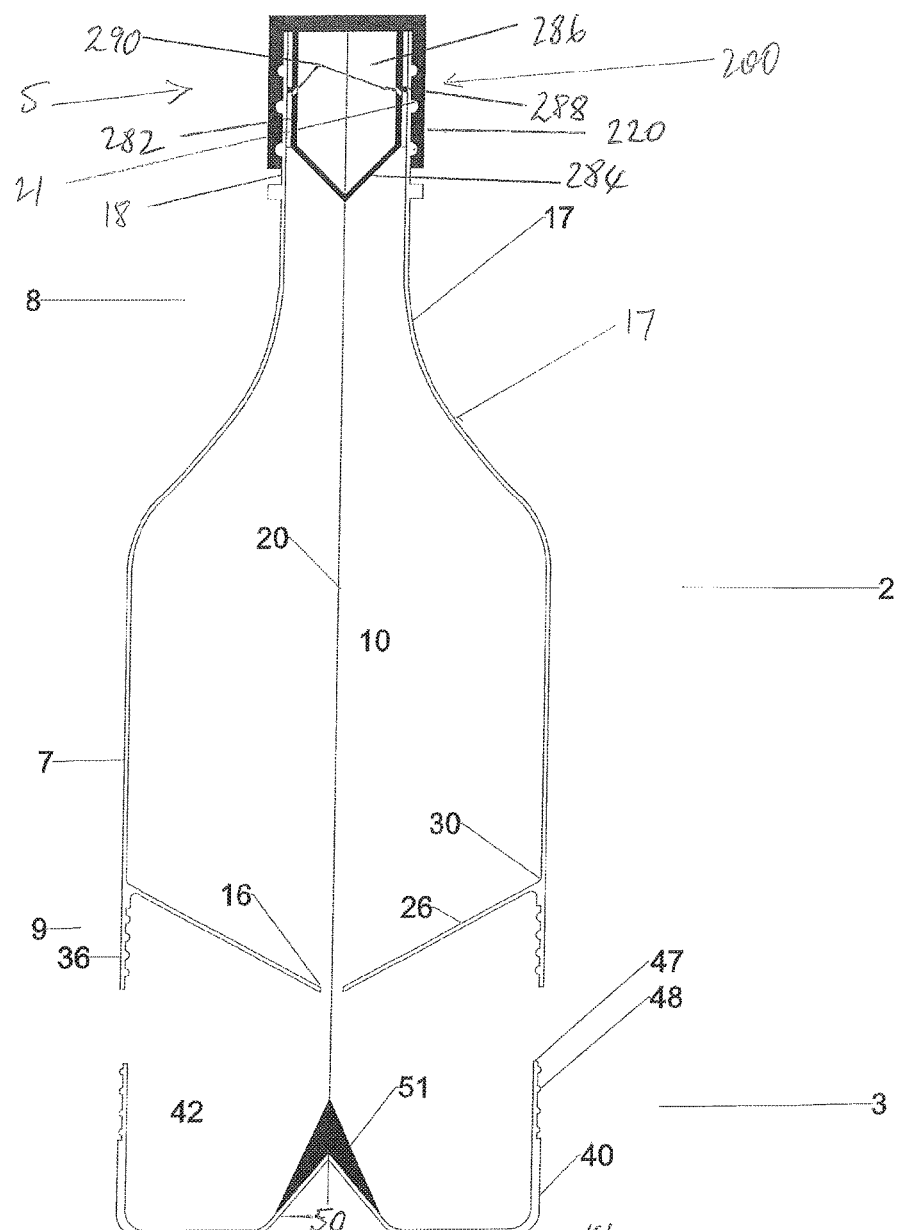
Figure 37:
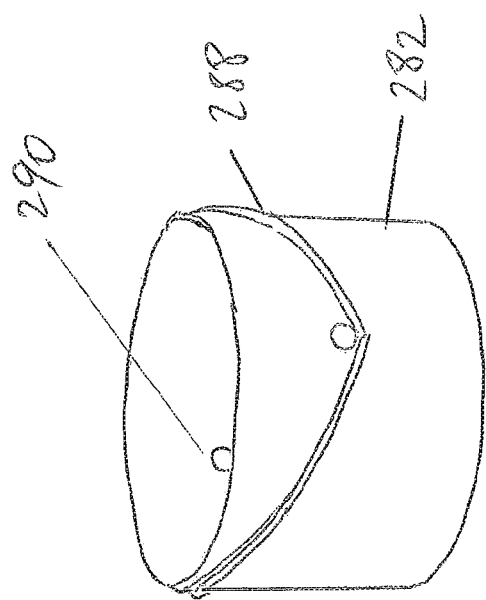
Figure 36:
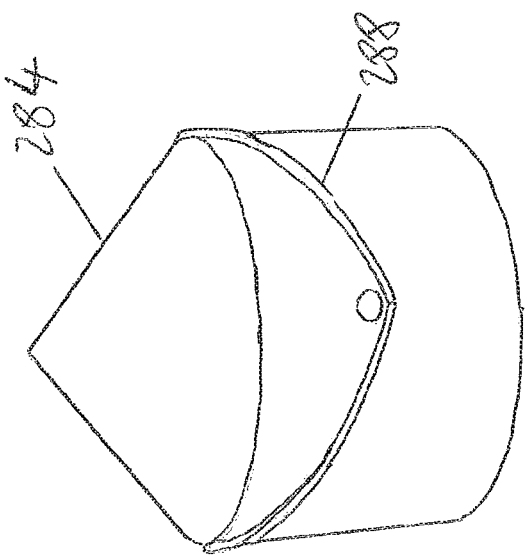

In FIG. 4 there is disclosed a variation in the sediment forming means of the lower part 3 of the container, which can be referred to as a third raised portion which includes at least one post member 55 combined with at least one bead 56, instead of just the movable conical stopper member 51 of FIGS. 1, 14 and 15. Post member 55 extends upwardly from the peak or point of cone shape member 50 and is shaped as a post with a thickness which can be separately formed and connected to cone shaped member 50 or it can be integrally formed with cone shaped member (or portion) 50. Post member 55 includes a top end 58, a stem portion 59 and a post base 60 which can also be curved if desired or required. From top end 58 to post base 60 is defined a height and the stem portion 59 has a thickness defining a width 62. Bead 56 is sized having an aperture 56A to allow it to slidably inter-fit over the post member 55 thickness. The height of post member 55 is such that post member 55 extends upwardly into or through second opening 16 of the upper part 2, providing a peripheral gap there around the post member but preventing the bead 56 from passing through second opening 16 which is large enough to block the second opening 16 when the container is turned upside down.

Figure 8:
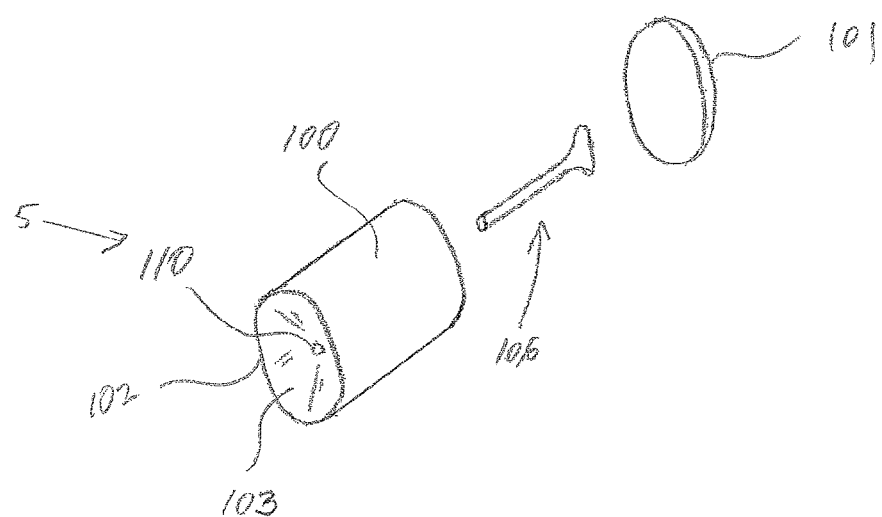

In FIGS. 7 and 8 there is a second embodiment of the cap assembly where the raised portion being the post member 106 which is separately formed to the walls 100 with walls 103. All other components of the cap assembly are already described in page 9 cap assembly first embodiment. Furthermore the height or length of the post member 106 can be varied to be positioned either close to the aperture 110 within aperture 110 or beyond.

In FIG. 9-13 there are several more variations in embodiments for the cap assembly 5 having different sediment forming means. Each figure has a cap assembly being assembled from a separate cap member 200 and separate plug member (made up of the side walls 202 combined with angled walls 203) and raised portions including post member 206. There are three views per embodiment. Figure with the top most view a) showing the cap assembly assembled, the second view b) showing the plug member and the lower third view c) showing the cap member.

In each of the embodiments in FIGS. 9-13 there is shown the same cap member 200 which comprises a square U shape in cross section, which is circular and cylindrical/tubular in 3 D overall shape, and which is made up of walls 220 and a base 221 with a recess space 222 there between.

The plug member for FIGS. 9-12 and 14 is shaped substantially as an "M" frame cross section but is also similarly circular and cylindrical/tubular in 3 D shape. The M shape has side walls 202 supporting angled walls 203 with a central opening 210 therein and semi enclosed space 204.

The post member 206 has a height 261 and thickness 262.

In FIG. 9, the raised portion as post member 206 is a slender post like the post member formed as part of the cap assembly 5 of FIG. 4, but with a point end 207 with a bead 208 frictionally slotted on the post member 206. Bead 208 can be manufactured with a central hole or the bead can simply be inserted by being pierced by the point end 207 of post member 206. Bead 208 can be removably attached which can allow it to either stay in place or be moveable in response to orientation or fluid movement there past.

In FIG. 10, the raised portion as the post member 206 is a separate movable member to the cap member 200, having a similar shape to that in FIG. 9 but is thicker and includes a post base portion for location on an inner surface of the base 221 of the cap member 200 which allows the movable post member 206 to be resting on the inner surface when upside down to allow entry of fluid and sediment and then when the container is rotated, the movable post member slides or moves down to block central aperture 210.

In FIG. 11, the post member 206 is a separate member to the cap member 200, having a similar shape to the post member in FIGS. 9 and 10 but being shaped to a smaller height and being formed as part of the cap member and having a bead 208 in the shape similarly to that of conical stopper member 51 in FIGS. 1 and 14 which is an arrow head in cross section, which like in FIG. 9 is movably fitted over point end 207 of the post member 206 when the cap assembly or container is rotated.

In FIG. 12 post member is similar to FIG. 11 but is taller 261 having no bead 208 and only the M shaped plug member.

FIGS. 13 and 15 include a square U shaped cap member like the other embodiments but with no raised portion such as a post member but does have the plug member in the form of a house frame cross section ie a box frame including walls 282 and a peaked roof 284. Furthermore the house frame includes an enclosed space or inner recessed space 286, rib members 288 located peripherally on the outside walls 282 of the box frame which are shaped to form a concave or curved drainage pathway with a lowest point with at least one drainage aperture 290 located at that lowest point whereby at least sediment or without liquid is caused by the rib member(s) 288 to be directed down to the drainage aperture 290 to drain through and into the recessed or inner recessed space 286 for collection and later removal of the trapped sediment.

The plug member of FIG. 13 is also shown in FIGS. 16 and 17 and also forms part of the cap assembly of FIG. 14.

In FIG. 14 the cap assembly includes the cap member 200 of FIGS. 9-13 with a thread 21 for inter-engagement with a matching abutting thread of the neck portion 18 of a container and M shaped plug member but with a movable T cross sectional shaped inner plug member 206A to be located in the central aperture 210 of the M shaped plug member to block the aperture 210 when required due to different orientation of the cap assembly and/or container. The T cross section has a cross member 300 and cross support member 302 whereby the cross member 300 is slidably located within the recessed space 204 with the cross support slidably to be held within the aperture 210 when the container or cap assembly is moved or rotated the T shaped plug moves into place to block the aperture (by the cross member 302 being retained within recessed space 204 to cap the drainage aperture when required depending on the orientation of the cap assembly) when required to retain any sediment therein, in the recessed space 204. The container has the same sediment forming means in the lower portion as that shown in FIGS. 1 and 15.

In FIG. 15 the cap assembly includes the cap assembly of FIG. 13 but threading engagement 21 with the neck portion of a container and also including a plug member 206A shaped similar to the plug member of FIG. 13. The container has the same sediment forming means in the lower portion as that shown in FIGS. 1 and 14.

FIGS. 16 and 17 are close up views of the plug member used in FIGS. 13 and 15 which includes a cylindrical shaped body with a conical head at one end. Ribs 210 are provided circumferentially around the outside of one end of the cylindrical body to form a concave curve with a drainage aperture 220 located at its lowest point to allow sediment form outside of the plug member to be directed by the rib 210 down to the drainage apertures and through to the inside of the plug member.

The height of the post member 55, 106, 206 conical stopper member 51 or raised incline or cone shaped portion 50 can be varied also to suit the liquid and size of container. Furthermore, the container can be formed as a one piece container rather than having an upper part 2 and lower part 3.

Conical stopper member 51 can also optionally have a guiding member to guide the conical stopper member 51 to block or cover the aperture 16 when the container or lower part 3 is turned upside down. The guiding member can include a post extending from the inside of base 41 or be guiding outer side walls located on an underside (container being upright) of walls 26.

In yet other options the engagement of the cap assembly to the neck portion 18 of the container and the engagement of the upper part 2 to the lower part 3 of the container can be varied to suit requirements and can include for example, threads eg in FIGS. 14 and 15 or frictional engagement such as in FIGS. 4-13. Shoulder portion 17 can be simply an angled slope as in FIGS. 1, 4 or it can be curved as in FIGS. 14 and 15.

Though the present invention is described for use in trapping and/or separating a sediment, it is obvious that this apparatus can be used to separate and trap more than just a loosely defined 'sediment' but also many other types of material impurities or substances or just unwanted matter or materials that are part of a pourable.

Other uses of the present invention include any fluid beverage or liquid that can have inherent residue that needs to be separated and or removed such as for example fruit juice, green tea or any drink. Other examples of possible use, include in the chemical industry where sediment is formed with the mixing or combination of one or more ingredients or in other methods where there is a need to separate or remove a certain ingredient or element. Yet other examples of use, can be in waste water or sewerage treatment where sewerage waste water must be processed in a series of steps in various apparatus, to form useful solid waste or silt and cleaner grey water.

It will of course be realised that while the foregoing has been given by way of illustrative example of this invention, all such and other modifications and variations thereto as would be apparent to persons skilled in the art are deemed to fall within the broad scope and ambit of this invention as is hereinbefore described.

It will also be understood that where a product, method or process as herein described or claimed and that is sold incomplete, as individual components, or as a "kit of Parts", that such exploitation will fall within the ambit of the invention.

These and other features and characteristics of the present invention, as well as the method of operation and functions of the related elements of structures and the combination of parts and economics of manufacture, will become more apparent upon consideration of the following description with reference to the accompanying drawings, all of which form part of this specification, wherein like reference numerals designate corresponding parts in the various figures.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

For purposes of the description hereinafter, the terms "upper", "lower", "right", "left", "vertical", "horizontal", "top", "bottom", "lateral", "longitudinal", "side", "front", "rear" and derivatives thereof shall relate to the invention as it is oriented in the drawing figures. However it is to be understood that the invention may assume various alternative variations, except where expressly specified to the contrary. It is also to be understood that the specific devices illustrated in the attached drawings, and described in the following specification are simply exemplary embodiments of the invention. Hence specific dimensions and other physical characteristics related to the embodiments disclosed herein are not to be considered as limiting.

What I claim is:

1. An impurities or materials trapping apparatus for separating or trapping selected impurities or unwanted materials in a pourable material, the apparatus comprising:
   a cap assembly, formed of a cap member (200) and a plug member,
   the plug member having
      plug member side walls between a first end and a second end, defining at least an inner recessed space therebetween for receiving a pourable material,
      angled walls connected to the plug member side walls, and
      at least one drain aperture located within the plug member side walls or angled walls,
   wherein in an orientation of the apparatus, the plug member side walls or angled walls drain at least a portion of the pourable material towards and through the at least one drain aperture,
   wherein the angled walls and the plug member side walls form a house frame cross sectional shape with a peaked roof and the inner recessed space located therein,
   wherein rib members are provided on an outer surface of the plug member side walls to provide a drainage pathway, and the at least one drain aperture is provided at a lowest point of the drainage pathway to allow entry of the pourable material into the inner recessed space, and
   wherein the cap member of the cap assembly is formed by cap member side walls (220) and a cap member base (221).

2. The apparatus as claimed in claim 1, further comprising:
   a body with an upper part (2) and lower part (3),
   the lower part formed of upright side walls (40) and a base (41) enclosing a recessed space (42),
   an inner surface of the base (41) forming a first raised portion (50), which comprises a cone shaped member upwardly leading to a peak,
   wherein the cap assembly is adapted to engage with the upper part of the body.

3. The apparatus as claimed in claim 2, wherein a second raised portion (51) is positioned and located on top of the first raised portion (50) and is formed as a movable conical stopper member having an arrow head shape.

4. The apparatus as claimed in claim 3,
   wherein the upper part (2) includes an upper body and upper side walls between a first end and second end to form a contained inner space (10), the second end provided with a drainage aperture (16), and
   wherein the second raised portion (51) is sized and positioned to in use be able to cover and block the drainage aperture (16) when the apparatus is oriented upside down.

* * * * *